June 21, 1938. J. A. J. BENNETT 2,121,536
AIRCRAFT SUSTAINING ROTOR
Original Filed Sept. 14, 1935 4 Sheets-Sheet 3
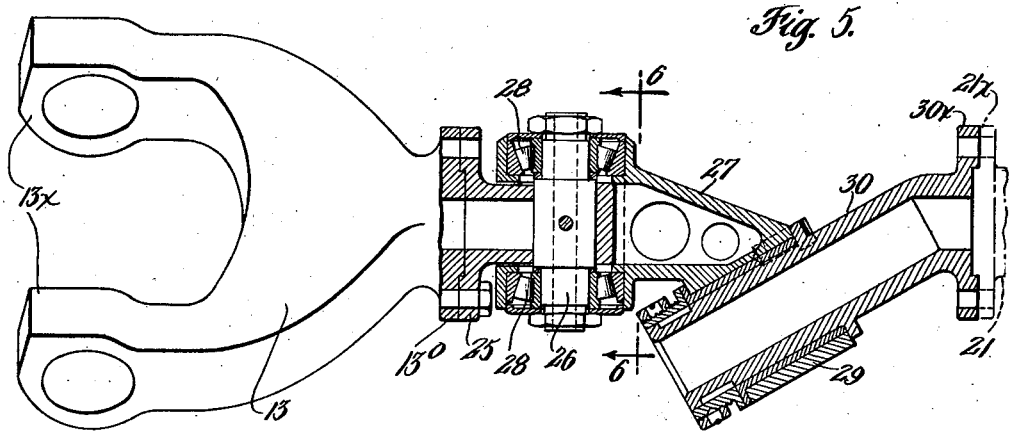
Fig. 5.
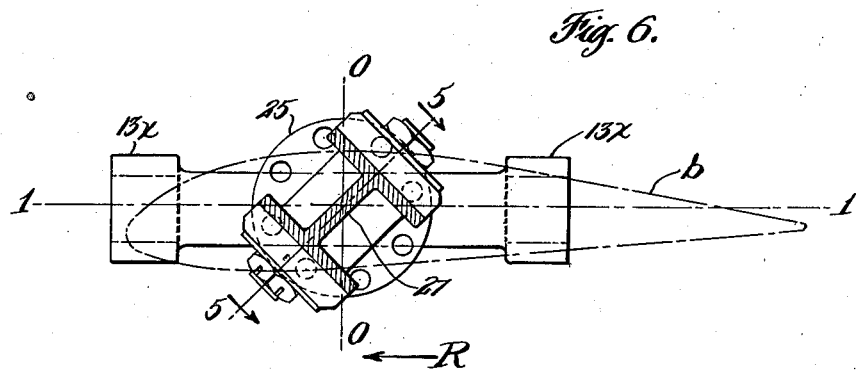
Fig. 6.
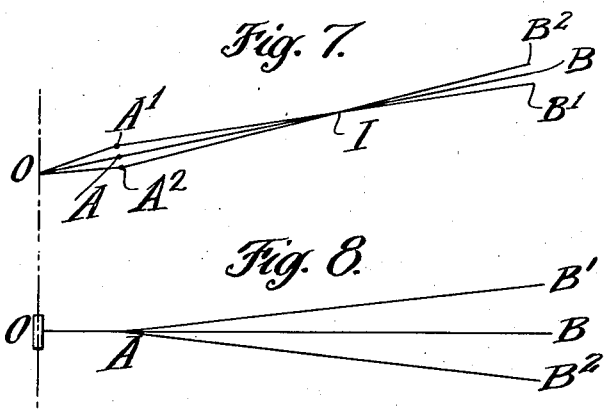
Fig. 7.
Fig. 8.
INVENTOR
James Allan Jamieson Bennett
BY
Synnestvedt & Lechner
ATTORNEYS

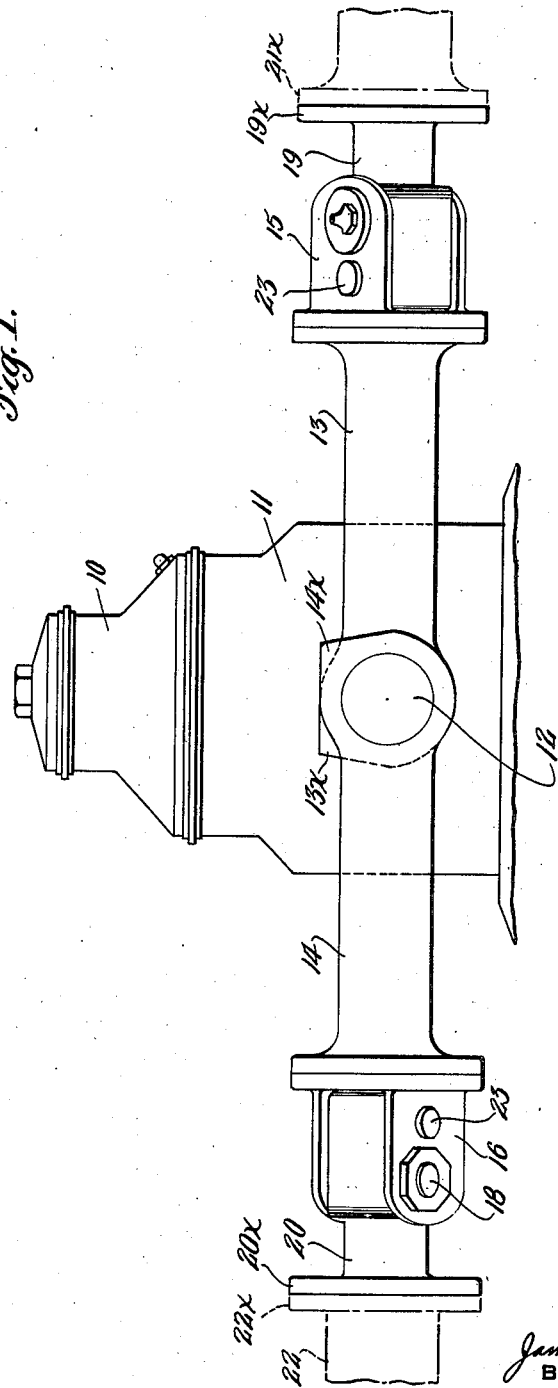

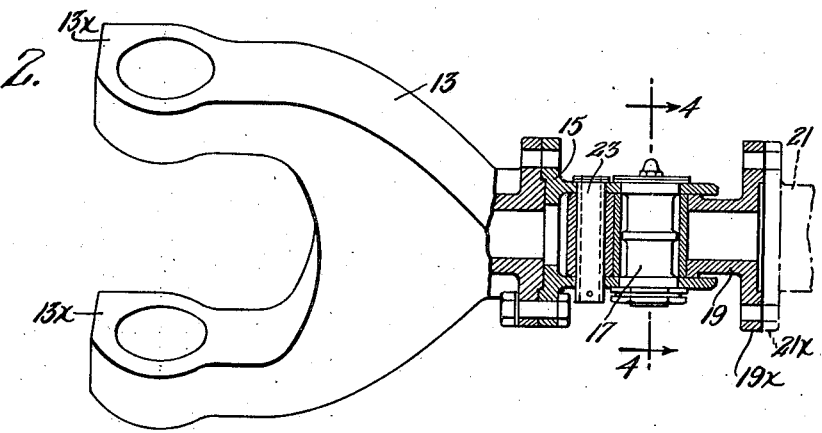
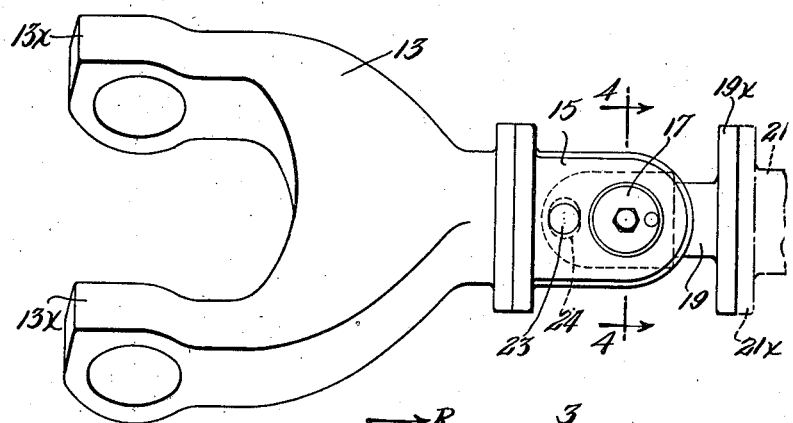
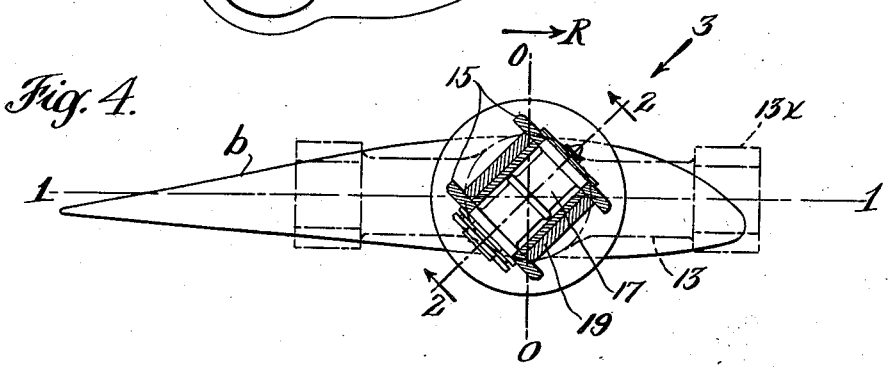

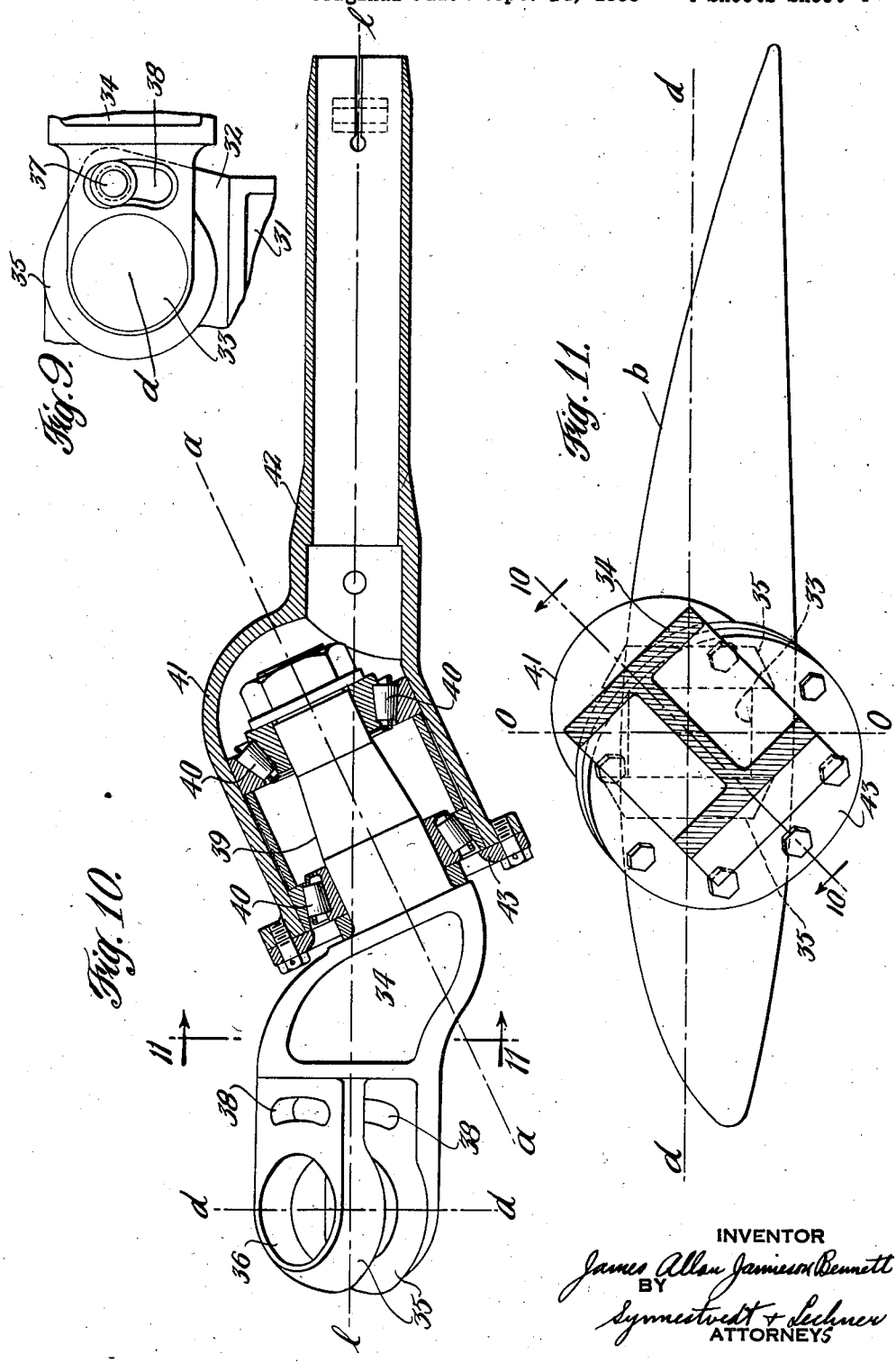

Patented June 21, 1938

2,121,536

UNITED STATES PATENT OFFICE 2,121,536

AIRCRAFT SUSTAINING ROTOR

James Allan Jamieson Bennett, Genista, Newton Mearns, Scotland, assignor to Autogiro Company of America, Willow Grove, Pa., a corporation of Delaware Application September 14, 1935, Serial No. 40,566
Renewed September 15, 1937. In Great Britain September 17, 1934

21 Claims. (Cl. 244—18)

This invention relates to aircraft sustaining rotors of the kind having blades rotatable about a substantially vertical axis and is more especially applicable to those rotors which are normally autorotative or driven by the flight wind.

This invention relates only to "doubly articulated" rotors, which are herein defined as those rotors whereof the blades are each articulated to the hub member by joint means having at least two independent axes, permitting each blade not only to "flap", i. e. to oscillate in a plane containing the rotational axis of the rotor and the longitudinal axis of the blade, but also to oscillate in a plane perpendicular to the rotational axis, such oscillation being usually called a "drag oscillation".

Hitherto it has been usual to provide a "flapping" pivot about which the motion is exclusively one of flapping, the drag pivot axis being in a plane substantially perpendicular to the flapping pivot axis.

The oscillations of the blade about the drag hinge have been damped by frictional means, the amount of friction being adjustable so that the damping could be made sufficiently great to prevent large oscillations of the blade, yet sufficiently small to prevent the blades from oscillating in a jerky manner during flight. Frictional damping possesses certain inherent objections due mainly to the necessity for careful adjustment of all the dampers at frequent intervals. If the damping is considerable the oscillations of the blades about the drag hinges in flight tend to become jerky and in the case of machines having "direct control", i. e. controlled by tilting the rotor axis, causes roughness in the controls.

An object of the present invention is to eliminate frictional damping of the drag oscillation altogether.

To this end, the invention provides for an appreciable degree of aerodynamic damping of the drag oscillation and thereby enables the frictional damping of the drag oscillation to be entirely eliminated or at least so reduced in amount as to avoid the disadvantages set forth above.

According to the present invention, the articular pivot means of the rotor blade mounting is so arranged that a drag oscillation of the blade has necessarily associated therewith an oscillatory movement of the blade in the flapping plane also.

According to one such arrangement, the articulation of the rotor blade mounting has two pivot axes offset from one another along the longitudinal blade axis and so oriented that displacement of the blade in the plane of rotation necessitates an angular displacement of the blade about both of the said pivot axes.

In order to clarify the description of the invention the following terminology, now coming into use among those engaged in this art, will be used; viz. the pivot axis, whereby the link, hitherto known as the "drag link", is articulated to the hub structure, will be referred to as the "delta" axis, and the pivot axis whereby the rest of the blade structure is articulated to the link will be referred to as the "alpha" axis. Usually the alpha axis intersects the longitudinal blade axis further from the rotational axis than does the delta axis.

The invention may be carried into practice by so orienting the alpha pivot axis that its projection on a plane containing the rotational axis and perpendicular to the flapping plane of the blade is inclined at an acute angle to the rotational axis at least within the utilizable ranges of pivotal displacements, the delta pivot axis being parallel neither to the rotational axis nor to the alpha axis.

In Patent No. 1,985,819 an arrangement is disclosed in which the "alpha" and "delta" pivots are purely "drag" and "flapping" pivots respectively and their respective offsets from the rotational axis are so chosen that the natural frequency of the blades in drag oscillation bears a harmonic relation to the rotational speed. This arrangement, in some rotors, has not been found entirely effective in practice in suppressing resonant oscillations of the blade and the present invention is distinguished therefrom in that its essential characteristic is that there is no purely drag pivot, so that displacements of the blade in the drag plane involve displacements about both alpha and delta axes.

Further, a displacement of the blade about the alpha pivot axis is compounded of a drag displacement and a flapping displacement so that a displacement of the blade in the drag plane without flapping necessitates a displacement about the delta pivot axis, whereby the flapping components of the alpha and delta displacements neutralize each other. As the alpha and delta pivots are offset from one another along the blade axis, an oscillation of the blade in the drag plane necessitates some movement of the blade in the flapping plane, which rocks in this plane about its centre of inertia and this movement gives rise to an aerodynamic damping of the drag oscillation.

In addition, the damping effect of friction in the blade pivots is enhanced because a given angular displacement in the drag plane necessitates a greater angular displacement about the alpha pivot and also a displacement about the delta pivot. The amount of damping both aerodynamic and frictional is mainly dependent on the velocity of the oscillations and is therefore large only when the oscillations are rapid.

It is not essential for the purposes of this invention that the delta pivot be a purely flapping pivot, though this constitutes one convenient arrangement; the delta pivot axis may, if desired, be inclined to the plane of rotation, i. e. the plane perpendicular to the rotational axis, for example as disclosed and claimed in the copending application of Juan de la Cierva, Serial No. 59,292, filed January 15, 1936. Furthermore either or both the delta and alpha axes may be other than perpendicular to the longitudinal blade axes, so that either flapping or drag movements give rise to changes in blade pitch angle.

According to the present invention, the inclination of the alpha axis to the flapping plane may be in either direction, i. e. either forwardly or rearwardly with respect to the direction of rotation.

In what follows, three embodiments of the invention are described with reference to the accompanying drawings. In no case is the structure of the aircraft shown, as this may follow normal practice for autorotative rotary winged aircraft as described for example in Juan de la Cierva's British patent specification No. 393,976 (or the corresponding United States application, No. 645,985, filed December 6, 1932); the rotor hub is only indicated in outline as the invention is solely concerned with the arrangement of the blade articulations.

In the drawings:—

Fig. 1 is a view in side elevation of the rotor hub of the first embodiment of the invention.

Fig. 2 shows the blade articulation assembly as viewed from below and in front, the showing being partly in section taken along the line 2—2 of Fig. 4.

Fig. 3 is a view of the same from above and in front taken in the direction of the arrow 3 in Fig. 4.

Fig. 4 is a view in cross section taken along the line 4—4 in Figs. 2 and 3.

Figs. 5 and 6 illustrate the second modification of the invention; Fig. 5 showing the rotor blade articulation as viewed from above and in front, being partly shown in section taken along the line 5—5 of Fig. 6; and Fig. 6 being a view of the same in cross section taken along the line 6—6 of Fig. 5.

Figs. 7 and 8 are line diagrams illustrating the motion of a rotor blade articulation in accordance with the invention; the plane of Fig. 7 being the flapping plane and that of Fig. 8 the drag plane.

Figs. 9 to 11 illustrate the third embodiment of the invention; Fig. 9 being a fragmentary view in elevation of a part of the blade articulation; Fig. 10 being a view of the blade articulation from below and behind, perpendicularly to the longitudinal blade axis, partly sectioned along the line 10—10 of Fig. 11; and Fig. 11 being a view in section, taken along the line 11—11 of Fig. 10.

Referring to Figs. 1 to 4; this shows a two-bladed rotor hub in which the "delta" pivot is common to the two blades and is a purely flapping pivot, being divided into two halves mounted trunnionwise on the sides of the hub member and the drag links being yoke-shaped and interdigitating as described in the specification of Bennett and Hodgess copending British patent application No. 26,662 of 1934 (and in the corresponding United States application, No. 40,386, filed September 13, 1935).

The rotor hub is shown at 10, 11 and supports "delta" or flapping pivot trunnions 12 on which the inner ends 13x, 14x of drag links 13, 14 are rotatably mounted. In these figures the details of the delta pivot bearings are not shown, as these details form no part of the present invention.

To the outer end of the drag links 13, 14 are bolted forked members 15, 16 carrying pins 17, 18 which constitute the axes of the alpha pivots on which are articulated blade root members 19, 20 flanged at 19x, 20x for attachment to corresponding flanges 21x, 22x formed on the root ends of the blade spar sockets 21, 22.

The orientation of the pivot axes will most easily be followed by reference to Fig. 4, the plane of which is perpendicular to the longitudinal blade axis. In Fig. 4 the projection of the rotational axis on this plane is shown at 0—0 and the projection of the delta axis at 1—1, while the projection of the alpha axis lies along the section line 2—2. The outline of the rotor blade is shown at b and the chord is substantially parallel to the delta axis 1—1 which in this case is a purely flapping axis, being perpendicular to the line 0—0. The alpha axis, on the other hand, is inclined at an angle of about 45° to the line 0—0, the inclination in this instance being forwards and upwards with respect to the direction of rotation indicated by an arrow R.

Displacement of the blade about the alpha axis is therefore resolvable into a drag displacement in the direction 1—1 and a flapping displacement in the direction 0—0, the forward inclination of the alpha axis in this case causing the blade to rise as it moves back and vice versa.

The amplitude of movement about the alpha pivot is limited by stop means consisting of a pin 23 secured between the jaws of the fork 15 parallel to the alpha pivot 17 and engaging in a slotted hole 24 formed in the blade root member 19.

The second embodiment illustrated in Figs. 5 and 6 differs from the first in that the blade articulation includes in addition to the alpha and delta pivots a third pivot whose axis lies in a plane containing the longitudinal blade axis and the alpha axis but is inclined at an acute angle to the longitudinal blade axis so that blade displacements about this third axis give rise to changes in the pitch angle of the blade.

An arrangement of this kind is described in Bennett's copending United States Patent application Serial No. 21,454 but with the "alpha" pivot oriented as a purely drag pivot; the functioning of the third pivot to vary the blade pitch as described in said patent application is not detrimentally affected by inclining it together with the alpha pivot at an acute angle to the plane containing the rotational axis and longitudinal blade axis.

As before, a yoke-shaped drag link 13 is shown whose ends 13x articulate on the divided axle of the delta or flapping articulation. The outer end of the link 13 is flanged at 13o for attachment to a flanged lug 25 carrying the pivot pin 26 of the alpha articulation. This pin articulates with a forked link 27 by means of taper roller bearings 28, the lug 25 being inserted between the jaws of the forked member 27. The outer end of this member is formed as a bearing 29 in which is rotatable a stub axle member 30 flanged at 30x for attachment to the root flange 21x of the blade spar 21. The bearing assembly 29, 30, thus constitutes the third blade articulation pivot, whose axis is at an acute angle to the longitudinal blade axis.

The orientation of the alpha and delta axes will most easily be followed by reference to Fig. 6, the plane of which is perpendicular to the longitudinal blade axis and on which the projections of the rotational axis, the delta axis and the alpha axis are respectively indicated by the lines 0—0, 1—1 and 5—5, the blade profile outline being indicated in chain dotted lines at $b$. The direction of rotation is shown by an arrow R and in this instance the alpha axis is inclined backwardly and upwardly with respect to the line 0—0 at an angle of about 45°, so that displacement of the blade about the alpha axis is resolvable into a drag displacement in the direction 1—1 and a flapping displacement in the direction 0—0.

Figs. 7 and 8 illustrate diagrammatically the movement of the blade about the pivot axes. In these figures the position of the delta pivot axis is shown at O and the alpha pivot axis is shown at A, $A^1$, $A^2$. The mean position of the blade is shown in both figures at O, A, B and the positions resulting from displacing the blade in either direction about the alpha axis are shown at O, $A^1$, $B^1$ and O, $A^2$, $B^2$ in Fig. 7 and O, A, $B^1$ and O, A, $B^2$ in Fig. 8 in which view the points A, $A^1$, $A^2$ coincide.

If the blade is displaced about the alpha pivot through a small angle the angular displacement is resolvable into a displacement in the drag plane represented in Fig. 8 by the angle B, A, $B^1$ and a displacement in the flapping plane represented by the angle O, $A^1$, $B^1$ in Fig. 7. Now, if the blade performs an oscillation in the drag plane, there will be no tendency, other things being equal, for the centre of inertia of the blade, indicated at I in Fig. 7, to leave the drag plane, and the flapping displacement O, $A^1$, $B^1$ or O, $A^2$, $B^2$ will be compensated by a displacement of the drag link about the delta axis O through an angle indicated in Fig. 1 at A, O, $A^1$ or A, O, $A^2$. Therefore an oscillation of the blade in the drag plane from $B^1$ to $B^2$ and back again is necessarily accompanied by rocking of the blade in the flapping plane about its centre of inertia from $A^1$, $B^1$ to $A^2$, $B^2$ and back again. Further, the rocking movement in the flapping plane about the centre of inertia provides the aerodynamic damping of the drag oscillation.

In the third embodiment, shown in Figs. 9 to 11, the alpha pivot axis of the blade articulation is inclined to the longitudinal blade axis so that movements about the alpha pivot give rise to changes in the pitch angle of the blade as described for instance in copending Cierva United States Patent application Serial No. 738,349. In Fig. 9 whose plane is parallel to the flapping plane, the rotor hub is shown fragmentarily at 31 and incorporates a flat pivot lug 32 lying in the flapping plane and carrying a pin 33 forming the axle of the delta pivot, which in this instance is a purely flapping pivot, its axis $d$ being perpendicular to the plane of Fig. 9.

The articulating link 34 terminates inwardly in a forked end, bored at 36 to receive the delta pin 33, on which the link is rotatable for flapping, the lug 32 fitting between the jaws 35 of the fork. Flapping movement is limited by a stop pin 37 carried by the lug 32 and projecting on either side thereof into arcuate slots 38 formed in the jaws 35.

The link 34 terminates outwardly (Fig. 10) in a stub axle 39 on which is rotatably mounted by means of taper roller bearings 40 a housing 41 integral with the blade root socket 42, the bearings being retained by a ring member 43 secured to the housing 41 and serving to transmit the centrifugal force of the blade to the bearings.

The pivot assembly 39, 40, 41 constitutes the alpha pivot of the blade articulation, and its axis $a$—$a$ is inclined at an acute angle to the longitudinal blade axis $l$—$l$ (see Fig. 10), so that blade displacements about the alpha axis involve variation of the blade pitch angle.

Reference to Fig. 11 shows that the projection of the alpha axis on the plane containing the rotational axis and perpendicular to the flapping plane is inclined backwardly and upwardly with respect to the rotational axis at an acute angle, it being premised that in the position shown in all the figures the blade axis $l$—$l$ is perpendicular to the rotational axis, so that the plane of projection above referred to is parallel to the plane of Fig. 11, on which the projections of the rotational axis, the alpha axis and the delta axis are respectively indicated by the lines 0—0, 10—10 and $d$—$d$. In Fig. 11 the blade profile is indicated at $b$, the chord being substantially parallel to the delta axis. It will further be seen from Fig. 10 that the intersections with the longitudinal blade axis $l$—$l$ of the alpha axis $a$—$a$ and of the delta axis, whose projection is shown at $d$—$d$ in Fig. 10, are substantially offset from one another. The blade articulation shown in Figs. 9–11 therefore operates in the manner described with reference to Figs. 7 and 8, the inclination of the alpha axis $a$—$a$ at an acute angle to the blade axis $l$—$l$ serving only to superimpose on the flapping and drag displacements a change of pitch angle, without substantially modifying the changes of configuration described with reference to Figs. 7 and 8, at least for small displacements about the alpha axis. Similarly the inclination of the alpha axis $a$—$a$ to the plane containing the rotational axis 0—0 and the longitudinal blade axis $l$—$l$ does not substantially affect the functioning of the inclination at an acute angle of the axes $a$—$a$ and $l$—$l$ in producing all the results flowing from automatic change of pitch with displacement in the drag plane described in the said copending application Serial No. 738,349.

What I claim is:—

1. An aircraft sustaining rotor comprising a generally upright hub, a plurality of blades extending outwardly therefrom and normally positioned with respect thereto at an autorotational incidence, and for each blade a mounting link, a flapping or delta pivot approximately intersecting the longitudinal axis of the blade and articulating said link to the hub for movement of the link generally in a plane containing the hub axis, and a drag or alpha pivot approximately intersecting the longitudinal axis of the blade and articulating the blade to said link for oscillation with respect thereto; the axis of said alpha pivot, projected on a plane containing the hub axis but perpendicular to the longitudinal axis of the blade, making a substantial oblique angle with relation to the plane containing the hub axis and the longitudinal blade axis and also with relation to the general plane of the blade when the latter is in substantially true radial position, whereby oscillation of the blade on the alpha pivot with relation to the link is compounded of an appreciable movement of the blade in the plane of rotation and an appreciable movement in the plane transverse thereto.

2. An aircraft sustaining rotor comprising a generally upright hub, a plurality of blades extending outwardly therefrom and normally positioned with respect thereto at an autorotational incidence, and for each blade a mounting link, a flapping or delta pivot approximately intersecting the longitudinal axis of the blade and articulating said link to the hub for movement of the link generally in a plane containing the hub axis, and a drag or alpha pivot approximately intersecting the longitudinal axis of the blade at a point radially off set from the point of intersection of the delta pivot axis and the longitudinal blade axis and articulating the blade to said link for oscillation with respect thereto; the axis of said alpha pivot, projected on a plane containing the hub axis but perpendicular to the longitudinal axis of the blade, making a substantial oblique angle with relation to the plane containing the hub axis and the longitudinal blade axis and also with relation to the general plane of the blade when the latter is in substantially true radial position, whereby forces acting to displace the blade in a direction contained within the general path of rotation about the alpha axis also tend to produce an oscillation about the delta axis.

3. An aircraft sustaining rotor comprising a generally upright hub, a plurality of blades extending outwardly therefrom and normally positioned with respect thereto at an autorotational incidence, and for each blade a mounting link, a flapping or delta pivot approximately intersecting the longitudinal axis of the blade and articulating said link to the hub for movement of the link generally in a plane containing the hub axis, and a drag or alpha pivot approximately intersecting the longitudinal axis of the blade and articulating the blade to said link for oscillation with respect thereto; the axis of said alpha pivot, projected on a plane containing the hub axis but perpendicular to the longitudinal axis of the blade, making a substantial oblique angle with relation to the plane containing the hub axis and the longitudinal blade axis and also with relation to the general plane of the blade when the latter is in substantially true radial position, said oblique angle being in the neighborhood of 45°.

4. An aircraft sustaining rotor comprising a generally upright hub, a plurality of blades extending outwardly therefrom and normally positioned with respect thereto at an auto rotational incidence, and for each blade a mounting link, a flapping or delta pivot approximately intersecting the longitudinal axis of the blade and articulating said link to the hub for movement of the link generally in a plane containing the hub axis, and a drag or alpha pivot approximately intersecting the longitudinal axis of the blade and articulating the blade to said link for oscillation with respect thereto; the axis of said alpha pivot, projected on a plane containing the hub axis but perpendicular to the longitudinal axis of the blade, making a substantial oblique angle with relation to the plane containing the hub axis and the longitudinal blade axis and also with relation to the general plane of the blade when the latter is in substantially true radial position, said oblique inclination of the alpha axis being in an upward and forward direction with respect to the direction of rotation of the rotor.

5. An aircraft sustaining rotor comprising a generally upright hub, a plurality of blades extending outwardly therefrom and normally positioned with respect thereto at an autorotational incidence, and for each blade a mounting link, a flapping or delta pivot approximately intersecting the longitudinal axis of the blade and articulating said link to the hub for movement of the link generally in a plane containing the hub axis, and a drag or alpha pivot approximately intersecting the longitudinal axis of the blade and articulating the blade to said link for oscillation with respect thereto; the axis of said alpha pivot, projected on a plane containing the hub axis but perpendicular to the longitudinal axis of the blade, making a substantial oblique angle with relation to the plane containing the hub axis and the longitudinal blade axis and also with relation to the general plane of the blade when the latter is in substantially true radial position, said oblique inclination of the alpha axis being in an upward and rearward direction with respect to the direction of rotation of the rotor.

6. An aircraft sustaining rotor comprising a generally upright hub, a plurality of blades extending outwardly therefrom and normally positioned with respect thereto at an autorotational incidence, and for each blade a mounting link, a flapping or delta pivot approximately intersecting the longitudinal axis of the blade and articulating said link to the hub for movement of the link generally in a plane containing the hub axis, and a drag or alpha pivot approximately intersecting the longitudinal axis of the blade and articulating the blade to said link for oscillation with respect thereto; the axis of said alpha pivot, projected on a plane containing the hub axis but perpendicular to the longitudinal axis of the blade, making a substantial oblique angle with relation to the plane containing the hub axis and the longitudinal blade axis and also with relation to the general plane of the blade when the latter is in substantially true radial position, said alpha axis further being inclined in a radial direction.

7. An aircraft sustaining rotor comprising a generally upright hub, a plurality of blades extending outwardly therefrom and normally positioned with respect thereto at an autorotational incidence, and for each blade a mounting link, a flapping or delta pivot approximately intersecting the longitudinal axis of the blade and articulating said link to the hub for movement of the link generally in a plane containing the hub axis, and a drag or alpha pivot approximately intersecting the longitudinal axis of the blade and articulating the blade to said link for oscillation with respect thereto; the axis of said alpha pivot, projected on a plane containing the hub axis but perpendicular to the longitudinal axis of the blade, making a substantial oblique angle with relation to the plane containing the hub axis and the longitudinal blade axis and also with relation to the general plane of the blade when the latter is in substantially true radial position, said alpha axis further being inclined upwardly and outwardly so as to make an acute angle with the longitudinal axis of the blade.

8. An aircraft sustaining rotor comprising a generally upright hub, a plurality of blades extending outwardly therefrom and normally positioned with respect thereto at an autorotational incidence, and for each blade a mounting link, a flapping or delta pivot approximately intersecting the longitudinal axis of the blade and articulating said link to the hub for movement of the link generally in a plane containing the hub axis, and a drag or alpha pivot approximately intersecting the longitudinal axis of the blade at a point radially offset from the point of intersection of the delta pivot axis and the longitudinal blade axis and articulating the blade to said link for oscillation with respect thereto; the axis of said alpha pivot, projected on a plane containing the hub axis but perpendicular to the longitudinal axis of the blade, making a substantial oblique angle with relation to the plane containing the hub axis and the longitudinal blade axis and also with relation to the general plane of the blade when the latter is in substantially true radial position, said alpha axis further being inclined in a radial direction.

9. An aircraft sustaining rotor comprising a generally upright hub, a plurality of blades extending outwardly therefrom and normally positioned with respect thereto at an autorotational incidence, and for each blade a mounting link, a flapping or delta pivot approximately intersecting the longitudinal axis of the blade and articulating said link to the hub for movement of the link generally in a plane containing the hub axis, and a drag or alpha pivot approximately intersecting the longitudinal axis of the blade at a point radially offset from the point of intersection of the delta pivot axis and the longitudinal blade axis and articulating the blade to said link for oscillation with respect thereto; the axis of said alpha pivot, projected on a plane containing the hub axis but perpendicular to the longitudinal axis of the blade, making a substantial oblique angle with relation to the plane containing the hub axis and the longitudinal blade axis and also with relation to the general plane of the blade when the latter is in substantially true radial position, whereby forces acting to displace the blade in a direction contained within the general path of rotation about the alpha axis also tend to produce an oscillation about the delta axis, and a third pivot interposed between the blade and the alpha pivot and intersecting the longitudinal axis of the blade at an acute angle whereby the blade pitch varies with oscillation about said third pivot.

10. An aircraft sustaining rotor comprising a generally upright hub, a plurality of blades extending outwardly therefrom and normally positioned with respect thereto at an autorotational incidence, and for each blade a mounting link, a flapping or delta pivot approximately intersecting the longitudinal axis of the blade and articulating said link to the hub for movement of the link generally in a plane containing the hub axis, a drag or alpha pivot approximately intersecting the longitudinal axis of the blade at a point radially offset from the point of intersection of the delta pivot axis and the longitudinal blade axis and articulating the blade to said link for oscillation with respect thereto; the axis of said alpha pivot, projected on a plane containing the hub axis but perpendicular to the longitudinal axis of the blade, making a substantial oblique angle with relation to the plane containing the hub axis and the longitudinal blade axis and also with relation to the general plane of the blade when the latter is in substantially true radial position, whereby forces acting to displace the blade in a direction contained within the general path of rotation about the alpha axis also tend to produce an oscillation about the delta axis, and a third pivot interposed between the blade and the alpha pivot and intersecting the longitudinal axis of the blade at an acute angle whereby the blade pitch varies with oscillation about said third pivot, said third pivot having its axis extending generally upwardly and outwardly with respect to the longitudinal axis of the blade.

11. An aircraft sustaining rotor comprising a generally upright hub, a plurality of blades extending outwardly therefrom and normally positioned with respect thereto at an autorotational incidence, and for each blade a mounting link, a flapping or delta pivot approximately intersecting the longitudinal axis of the blade and articulating said link to the hub for movement of the link generally in a plane containing the hub axis, and a drag or alpha pivot approximately intersecting the longitudinal axis of the blade and articulating the blade to said link for oscillation with respect thereto; the axis of said alpha pivot, projected on a plane containing the hub axis but perpendicular to the longitudinal axis of the blade, making a substantial oblique angle with relation to the plane containing the hub axis and the longitudinal blade axis and also with relation to the general plane of the blade when the latter is in substantially true radial position, whereby oscillation of the blade on the alpha pivot with relation to the link is compounded of an appreciable movement of the blade in the plane of rotation and an appreciable movement in the plane transverse thereto, the axis of the delta pivot being positioned to intersect the hub axis.

12. An autorotatable sustaining rotor for aircraft, comprising a hub, a blade, and mechanism for articulating the blade upon the hub including: a pivot whose axis is substantially parallel to the blade chord and perpendicular to the longitudinal axis of the blade, a pivot whose axis is substantially perpendicular to the longitudinal axis of the blade and oblique to the blade chord, and a pivot whose axis is oblique to the plane of the blade, to its chord, and to its longitudinal axis.

13. An autorotatable sustaining rotor for aircraft, comprising a hub, a blade, and mechanism for articulating the blade upon the hub including; a pivot whose axis is substantially parallel to the blade chord and perpendicular to the longitudinal axis of the blade, a pivot whose axis is substantially perpendicular to the longitudinal axis of the blade and oblique to the blade chord, and a pivot whose axis is oblique to the plane of the blade, to its chord, and to its longitudinal axis, each of said pivot axes approximately intersecting the longitudinal axis of the blade and being spaced apart from each other, in the order named, in the outward radial direction.

14. In an aircraft sustaining rotor, a hub, an autorotative blade, and pivot mechanism mounting the blade on the hub including a pivot axis extended at an oblique angle to a plane containing the rotor axis and the longitudinal blade axis and a second and non-parallel pivot axis extended at an angle to a plane perpendicular to the axis of the rotor the inclination being upwardly and outwardly with respect to the blade axis, whereby the blade has compound oscillating and pitch-varying movements which are aerodynamically damped.

15. In an aircraft sustaining rotor, a hub, an autorotative blade, and pivot mechanism mounting the blade on the hub including a pivot axis extended at an angle to a plane perpendicular to the axis of the rotor the inclination being upwardly toward the trailing edge of the blade and a second pivot axis extended at an angle to a plane perpendicular to the axis of the rotor the inclination being upwardly and outwardly with respect to the blade axis.

16. In an aircraft sustaining rotor, an upright hub, a blade normally positioned on the hub at autorotational incidence and having its longitudinal axis extending generally radially from the hub, and means articulating the blade to the hub for oscillations with respect thereto in flight including a plurality of pivot devices, one such device providing a pivot axis for the blade which, when viewed along said blade axis, is at an acute angle to the blade chord and to the rotor axis, and another such pivot device being out of parallelism with that just mentioned and providing in large part for flapping movement of the blade, the said two pivot devices being spaced apart in a radial direction relative to the rotor axis.

17. In an aircraft sustaining rotor, a generally upright hub, an autorotatable blade with its longitudinal axis extending generally radially from said hub, and mechanism mounting said blade on said hub for oscillation relative thereto including a pivot device the axis of which, when viewed along the blade axis, is oblique to the axis of the hub and is obliquely inclined relative to the blade chord upwardly and rearwardly with respect to the direction of rotation of the blade.

18. In an aircraft sustaining rotor, a generally upright hub, an autorotatable blade with its longitudinal axis extending generally radially from said hub, and mechanism mounting said blade on said hub for oscillation relative thereto including a pivot device the axis of which, when viewed in plan, makes an acute angle with the blade axis at the outer side of the pivot rearwardly of the blade axis.

19. In an aircraft sustaining rotor, a generally upright hub, an autorotatable blade with its longitudinal axis extending generally radially from said hub, mechanism mounting said blade on said hub for oscillation relative thereto including a pivot device the axis of which, when viewed in plan, makes an acute angle with the blade axis at the outer side of the pivot rearwardly of the blade axis and, when viewed along the blade axis, is oblique to the axis of the hub and is obliquely inclined relative to the blade chord upwardly and rearwardly with respect to the direction of rotation of the blade.

20. In an aircraft sustaining rotor, a generally upright hub, an autorotatable blade with its longitudinal axis extending generally radially from said hub, and mechanism mounting said blade on said hub for oscillation relative thereto including two pivots the axes of which, when projected on a plane perpendicular to said blade axis, intersect each other, and at least one of said pivot axes is oblique to the rotor axis and to the blade chord.

21. An autorotatable sustaining rotor for aircraft, comprising a hub, a blade, and mechanism for articulating the blade upon the hub including: a pivot whose axis is substantially parallel to the blade chord and perpendicular to the longitudinal axis of the blade, a pivot whose axis is substantially perpendicular to the longitudinal axis of the blade and oblique to the blade chord, and a pivot whose axis is oblique to the plane of the blade, and to its longitudinal axis.

JAMES ALLAN JAMIESON BENNETT.